W. H. HUNT.
MANURE RECEPTACLE.
APPLICATION FILED JUNE 3, 1908.

935,511.

Patented Sept. 28, 1909.

2 SHEETS—SHEET 1.

Witnesses
Phil E. Barnes
C. C. Hines

Inventor
William H. Hunt.
By Victor J. Evans
Attorney

W. H. HUNT.
MANURE RECEPTACLE.
APPLICATION FILED JUNE 3, 1908.

935,511.

Patented Sept. 28, 1909.
2 SHEETS—SHEET 2.

Witnesses
Phil E. Barnes
C. C. Hines

Inventor
William H. Hunt.

By Victor J. Evans
Attorney

UNITED STATES PATENT OFFICE.

WILLIAM H. HUNT, OF NEW YORK, N. Y.

MANURE-RECEPTACLE.

935,511.  Specification of Letters Patent.  Patented Sept. 28, 1909.

Application filed June 3, 1908. Serial No. 436,458.

*To all whom it may concern:*

Be it known that I, WILLIAM H. HUNT, a subject of the King of Great Britain, residing at New York, in the county of New York and State of New York, have invented new and useful Improvements in Manure-Receptacles, of which the following is a specification.

This invention relates to and is designed to provide a novel and useful article for receiving and retaining the manure of horses and other animals while harnessed to vehicles, and thus preventing it from soiling or littering the streets, roads or highways or any ground over which the animals travel; and it is designed also to provide an easy, quick and practical means by which such device may be attached to any vehicle and as quickly and conveniently removed for emptying, cleaning and replacing the same with the least possible trouble.

The invention is further designed to provide a construction by which the receptacle may be attached to a horse and vehicle in such a manner that the greater portion of the weight of the receptacle and its contents will be supported from the vehicle and the animal relieved therefrom, and so that the receptacle will be at all times maintained in proper position and prevented from annoying or interfering in any way with the legs or other parts of the body of the animal.

The invention consists of the features of construction, combination and arrangement of parts hereinafter fully described and claimed, reference being had to the accompanying drawing, in which:—

Figure 1:
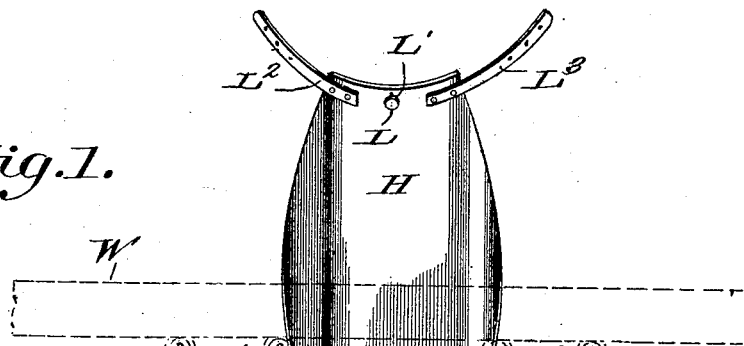
Figure 4:
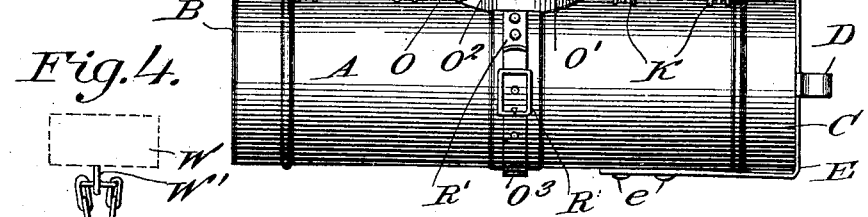
Figure 2:
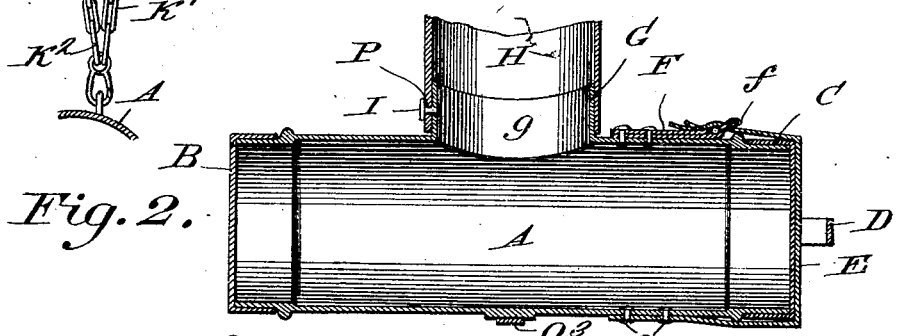
Figure 3:
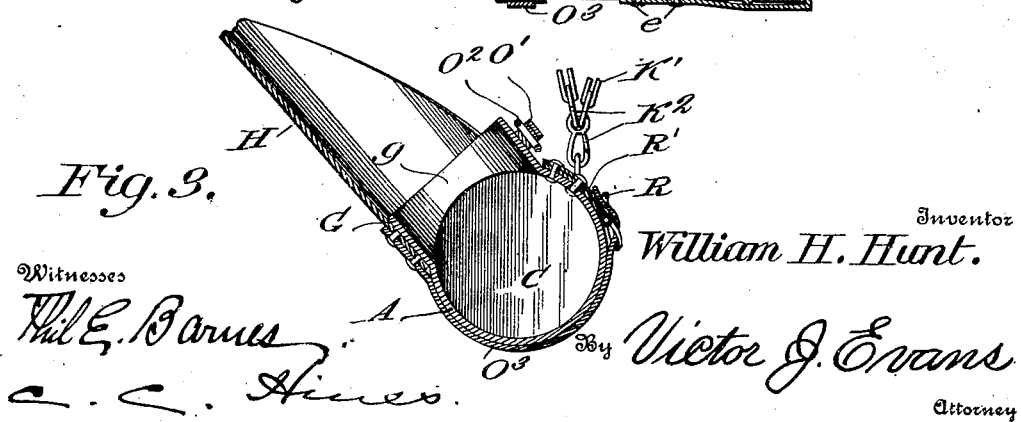
Figure 5:
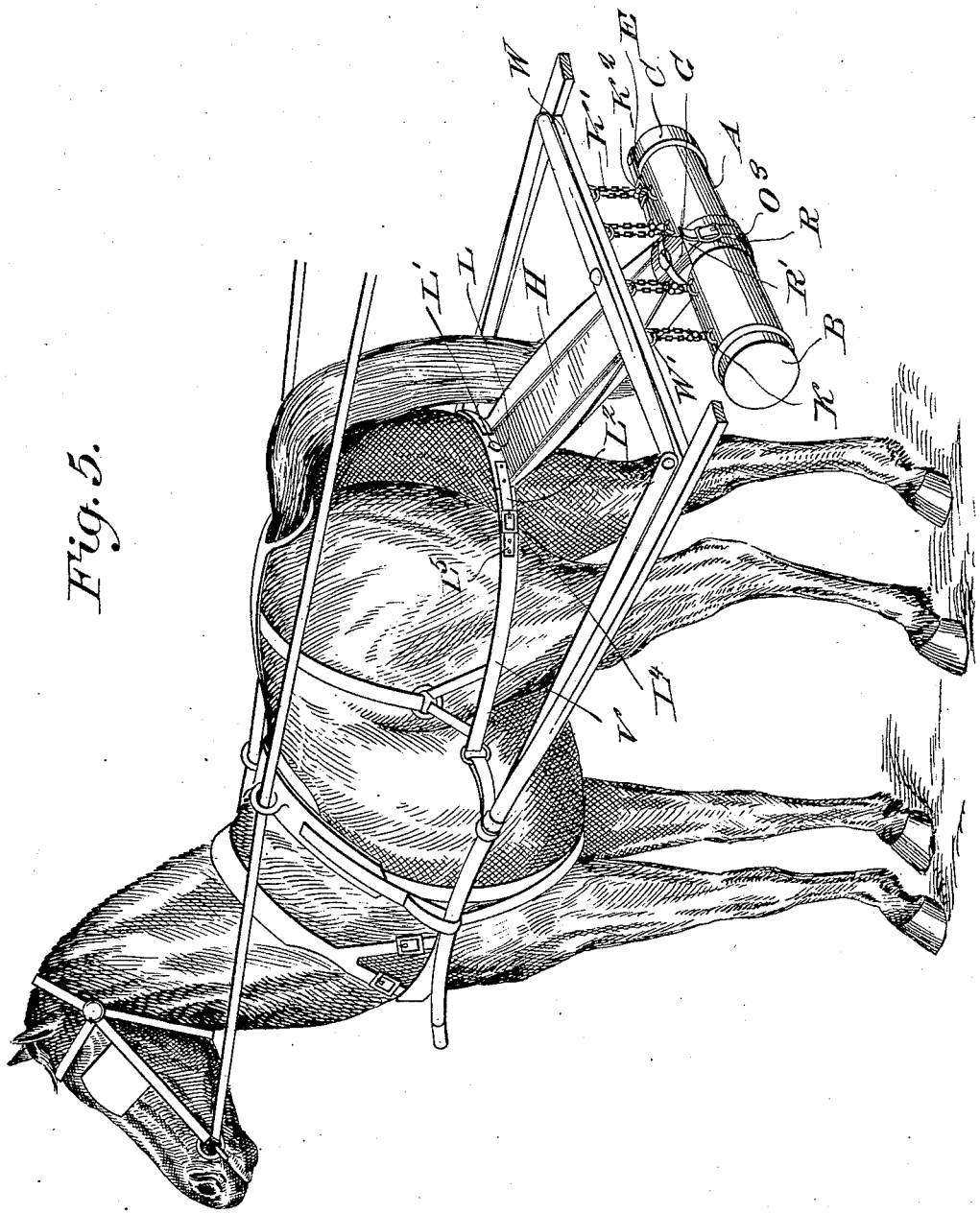

Figure 1 is a perspective view of the device as supported in position for use. Fig. 2 is a longitudinal section through the receptacle. Fig. 3 is a vertical transverse section through the center of the receptacle. Fig. 4 is a detail showing the construction and arrangement of one of the suspension chains. Fig. 5 is a perspective view showing the application of the invention.

My invention consists of a metal receptacle A preferably cylindrical in form, hollow and smooth inside and of suitable size for the purpose for which it is required or intended. One end of this receptacle may be permanently closed, or have either a permanent or removable cap or cover B. The other end of the receptacle is fitted with a removable cap or cover C for emptying and cleaning purposes; this cover has a suitable handle D to facilitate its manipulation. The cover C is held in position by a strap E which is secured at one end, as at $e$, to the bottom of the receptacle and passes through the handle D to prevent it from slipping off and is apertured at its free end to engage a buckle $f$ on a strap section F fastened to the top of the receptacle to hold the cover C firmly in its place on the body of the receptacle.

At a position preferably in the center of the top of the receptacle A is a circular inlet opening $g$ of suitable size to suit requirements. This circular opening is surrounded by a projecting lip or flange G made of the same or similar material as the body of the receptacle A and of proper length and diameter to form an effective support and close fitting connection for a flexible chute H. The inlet opening is formed in the upper forward side of the receptacle and the flange inclined upwardly and forwardly at an oblique angle therefrom. On one side of this lip or flange G is mounted in a strong and substantial manner a button or stud I, and on the opposite side of the center of the rear portion of the flange is an elongated eyelet or guide loop J at a position of about 45° off the center line of receptacle A. The purpose of the stud I and eyelet J is to retain the flexible chute H in position against its tendency to pull off under strain and is part of the fastenings working in conjunction with straps and buckles hereinafter explained.

Substantially fastened in the body of the receptacle A and placed on a line in rear of the inlet opening is a series of eyelets K for the purpose of suspending or supporting the receptacle A from the whiffletree bar W or other suitable portion or portions of the vehicle by means of suspension chains, straps, or other suitable suspending device K', which carry the entire weight of the receptacle A. The actual position of these eyelets K is gaged so that when the receptacle A is suspended in position the flexible chute H is partially suspended from the vehicle, thus relieving the animal of a portion of the weight of said chute. The said chains, straps, supports, or suspension devices K' are made long enough to pass through staples or eyes W' on the whiffletree bar W and return and hook on themselves or the eyelets K for the purpose of raising or lowering the receptacle A to adjustably support the receptacle, the ends of each chain being provided with snap hooks or catches K² for such purpose.

The flexible chute H consists of a section of leather or other suitable flexible material, partially circular at its lower end to lap three-quarters around the projecting lip G of the receptacle A and of sufficient length to reach therefrom to the breeching V of the harness when suspended in position under the bar W. As shown, the flexible chute H is made tapering on both sides, the wide end thereof being trimmed to suit the circular opening in the receptacle A and lapped around the lip G of receptacle A, the upper or narrow end of the chute extending to the breeching V and there fastened thereto in a curved position, thus causing the sides of the chute to curve upward in the form of a shallow trough to catch and retain all droppings and guide the same to the opening of the receptacle A, thus insuring positive collection of all deposits.

On the opposite sides of the lower end of the chute are straps O and O', one adapted for engagement with a buckle O² on the other, and in the side to which the strap O is attached is a button or stud hole P. By means of this hole P the flexible chute H is adapted to be engaged with the stud I and held in position on one side, then lapped around the lip G of the receptacle A, and the strap O' is then passed through the elongated eyelet J and fastened to the buckle O² on said strap O, thus fastening the chute to said lip. A strap O³ is fastened centrally to the bottom of the lower end of the chute and is passed upwardly and rearwardly around the body of the receptacle A, drawn tight, and fastened to a buckle R, on a strap section R' fastened on the top side of receptacle A, thus making a substantial fastening between the flexible chute H and the receptacle A, such strap O³ serving to hold the chute from relative upward movement.

The upper end of the chute is formed with a central button hole L to engage a button or stud L' on the breeching V, and is provided with straps L² and L³ to engage buckles L⁴ on straps L⁵ fastened to the sides of the breeching, thus securely and yet detachably securing the chute to the harness. These fastenings retain the upper end of the chute in position without throwing any part of the weight of the receptacle itself on the animal, the weight of the receptacle and part of the weight of the chute being sustained by the hangers K', so that but a part of the weight of the chute alone will be supported by the animal.

The object of employing a flexible chute and flexible suspension devices is to yieldingly retain the receptacle A in the desired position with sufficient freedom of movement to take care of the play (or lost motion) in the harness while changing from hauling to backing and vice versa, and to prevent any strain on the receptacle A or the fastenings for the same. The flexible chute H is long enough so that the receptacle A will hang in a position below the whiffletree bar W and far enough back so as not to interfere with the legs or heels of the animal while running, or walking, hauling or backing. By this means of fastening it does not matter what position the animals are in while attached to the vehicle, as the receptacle A being hung from the whiffletree bar W will always remain in the desired position. The purpose of making the flexible chute H and the receptacle A easily detachable one from the other, and both from their other fastenings, is to facilitate cleaning and the replacing of the same after this operation. The partially circular form of the receptacle A is preferable because of there being no corners and when the same is enameled a perfectly smooth interior is provided which may be easily kept clean and freely washed with water without injury. The droppings falling into the chute slide down the same by gravity into the receptacle. The handle D, it will be understood, allows the detached receptacle to be conveniently handled and carried.

It will be seen that my invention provides a receptacle which is supported or suspended in such a manner that it is out of the reach of the animals' legs or heels, and attached to the vehicle in such a manner with movable supports as to avoid any strain being placed on any part of it during hauling, backing or standing still, thus fulfilling every requirement for which it is intended, without being subject to damage.

My invention is neat and capable of being made ornamental for fine carriages; it is sanitary and its contents are concealed from view, thus making it unobjectionable to the eye. The long chute and the depth of the receptacle is such that it will in no way interfere with the use of the tail of the animal.

Having thus fully described the invention, what is claimed as new is:—

1. A device of the character described, comprising a horizontal receptacle open at one end and provided with a central inlet having an upwardly and forwardly projecting flange, a cover for closing the open end of the receptacle, said cover being provided with a carrying handle, means for detachably securing said cover to the receptacle, adjustable flexible suspension devices for suspending the receptacle horizontally below and from a transverse portion of the draft device of the vehicle, an inclined chute having a lower end of partially circular form to fit around said flange, means for detachably securing the said lower end of the chute above the flange, a fastening device for securing the lower end of the chute to the body of the receptacle to hold the chute from upward movement, and devices for detachably connecting the upper end of the chute with the sides of the breeching of the harness.

2. A device of the character described, comprising a horizontal receptacle open at one end and provided with a central inlet having an upwardly and forwardly projecting flange, a closure for the open end of said receptacle, adjustable flexible suspension devices for suspending the receptacle horizontally from a portion of the draft device of the vehicle, a fastening device upon one side of said flange, a guide upon the opposite side of the flange, an inclined chute having a lower end of partially circular form to fit around said flange, one of the free portions of said chute end being adapted for engagement with said fastening device and carrying a fastening strap having a buckle, a strap upon the other free edge of the end of the chute adapted to pass through said guide and to engage the buckle of the first-named strap, a fastening device connected with the front portion of the lower end of the chute and adapted to be passed around and engaged with the body of the receptacle to hold the chute from upward movement and disengagement from the flange, and devices for detachably connecting the upper end of the chute with the sides of the breeching of the harness.

In testimony whereof I affix my signature in presence of two witnesses.

WILLIAM H. HUNT.

Witnesses:
CHARLES G. KELLER,
ELIZABETH L. PEEBLES.